United States Patent
Oettinger et al.

(10) Patent No.: US 7,262,894 B2
(45) Date of Patent: Aug. 28, 2007

(54) METHOD FOR ALIGNING BI-DIRECTIONAL IMAGES IN A MIRROR DISPLAY

(75) Inventors: Eric Gregory Oettinger, Rochester, MN (US); James Eugene Noxon, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 177 days.

(21) Appl. No.: 11/190,719

(22) Filed: Jul. 27, 2005

(65) Prior Publication Data

US 2007/0024940 A1    Feb. 1, 2007

(51) Int. Cl.
*G02B 26/08* (2006.01)

(52) U.S. Cl. .............. 359/201; 359/198; 359/199; 359/202; 359/214; 359/900

(58) Field of Classification Search .............. None
See application file for complete search history.

(56) References Cited

U.S. PATENT DOCUMENTS 5,671,076 A * 9/1997 Matsubara et al. ......... 359/196
6,937,372 B2 * 8/2005 Kandori et al. ............ 359/198

* cited by examiner

*Primary Examiner*—James Phan
(74) *Attorney, Agent, or Firm*—William B Kempler; W. James Brady, III; Frederick J. Telecky, Jr.

(57) ABSTRACT

A mirror display system comprising a multiplicity of scan lines that are combined to generate an image. The multiplicity of scan lines are orthogonally positioned in response to a slow speed cyclic drive signal (for example, sinusoidal or repetitive triangular shape). To increase the brightness of the display, and unlike a typical raster scan display, scan lines are generated during both the positive going portion and the negative going portion of the cyclic drive signal.

9 Claims, 6 Drawing Sheets

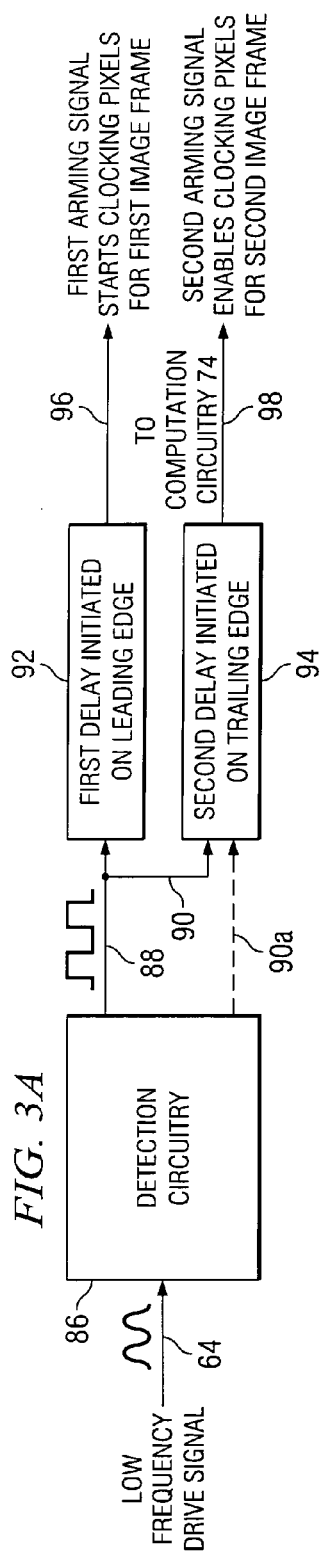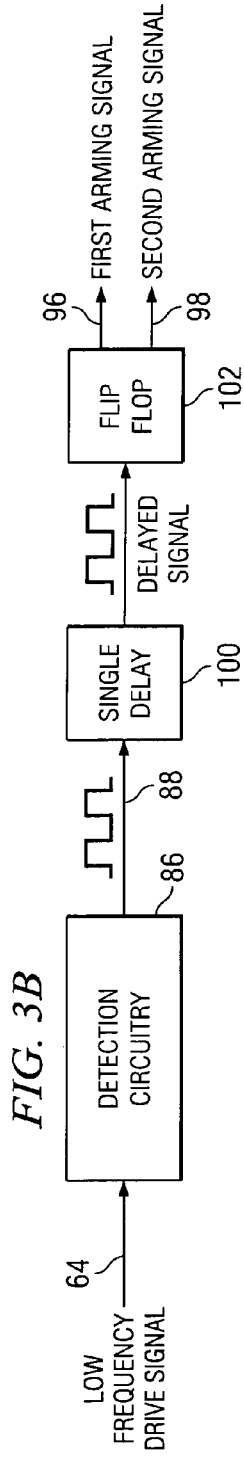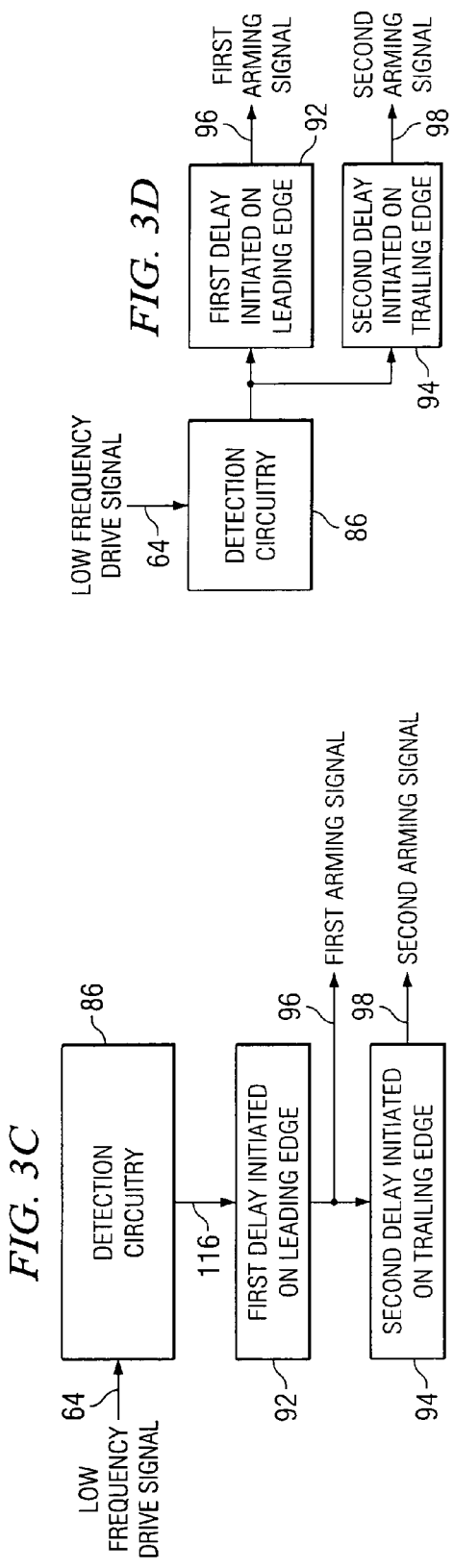

METHOD FOR ALIGNING BI-DIRECTIONAL IMAGES IN A MIRROR DISPLAY

TECHNICAL FIELD

The present invention relates to video display systems comprising a high speed resonant scanning mirror for generating scan lines to produce an image, and a low frequency oscillating mirror responsive to a cyclic drive such as a sinusoidal drive signal, wherein the low frequency oscillating mirror moves substantially orthogonal to the high speed mirror for positioning each of the scan lines. More particularly, the present invention relates to improving the quality of a display by generating an image frame in both the positive going portions and the negative going portions of the cyclic drive signal for the low frequency mirror.

BACKGROUND

In recent years torsional hinged high frequency mirrors (and especially resonant high frequency mirrors) have made significant inroads as a replacement for spinning polygon mirrors as the drive engine for laser printers. These torsional hinged high speed resonant mirrors are less expensive and require less energy or drive power than the earlier polygon mirrors.

As a result of the observed advantages of using the torsional hinged mirrors in high speed printers, interest has developed concerning the possibility of also using a similar mirror system for video displays that are generated by scan lines on a display surface.

Existing CRT (cathode ray tube) video systems for displaying such scan-line signals use a low frequency positioning circuit, which synchronizes the display frame rate with an incoming video signal, and a high frequency drive circuit, which generates the individual image lines (scan lines) of the video. In the existing systems, the high frequency circuit operates at a frequency that is an even multiple of the frequency of the low speed circuit and this relationship simplifies the task of synchronization.

Therefore, it would appear that a very simple corresponding torsional hinged mirror system would use a first high speed scanning mirror to generate scan lines and a second slower torsional hinged mirror to provide the orthogonal motion necessary to position or space the scan lines to produce a raster "scan" similar to the raster scan of the electron beam of a CRT. Unfortunately, the problem is more complex than that. The scanning motion of a high speed resonant scanning mirror cannot simply be selected to have a frequency that is an even multiple of the positioning motion of the low frequency mirror. Although a raster scan CRT system is easily controlled, and the quality is good enough and sufficiently bright for most applications, the display of a corresponding raster scan mirror based system may be dim, and would benefit from an increase in brightness and quality. For example, the scanning light beam is typically on for no more than 10 to 20% of the time. More specifically, the modulated light source is turned on and produces a scan line only when the high speed scanning mirror is moving or sweeping in one direction, or 50% of the time. Likewise, an image frame is generated only when the low speed cyclic positioning mirror is moving in one direction. Consequently, the time is reduced another 50%, thereby leaving a maximum possible time of 25%. Finally, since the high speed scanning mirror travels in one direction, stops, and turns around and then travels in the opposite direction, these turn-around portions (or peak points of the sinusoidal movement) are unsuitable for displaying image pixels. For example, if the high speed resonant scanning mirror has a constant frequency of 20 kHz, yet must slow down, come to a complete stop, and then accelerate in the opposite direction each time the beam sweeps across a display, it will be appreciated that the angular velocity of the mirror movement is anything but constant. However, to generate an image from periodically received pixels, the velocity and movement of the mirror should be substantially linear. Consequently, another 5 to 15% of the mirror movement that is located at turn around or peak portions are not used, which leaves only between about 10 to 20% of the total time that the modulated light beam is generating an image.

Based on the foregoing discussion, an immediate solution to the brightness and quality problem would appear to only require the system to generate an image frame during the unused half of the cyclic motion of one of either the positioning mirror or resonant mirror to double the brightness. Alternately, the unused half of both of the mirrors could be used to increase the brightness by a factor of four. According to the present invention, the image quality is improved and brightness is doubled by using both the positive going and the negative going portions of the slow speed positioning mirror to generate an image. Unfortunately, the problem is not solved by simply deciding to generate an image in both portions of the cyclic motion. The difficulty is aligning the two images for an acceptable display.

However, in addition to aligning the two images, the positioning motion of the low frequency mirror and consequently the low frequency drive signal must also be tied to the image frame rate of the incoming video signals to avoid noticeable jumps or jitter in the display. The term image "frame" as used herein means the image generated by scan lines during the travel of the slow speed mirror in a single direction, and in some embodiments the image frame may not be a full and complete image. For example, in interlaced displays, all of the image lines may not be present. In these embodiments the missing image lines may be filled in on the return sweep. At the same time, however, the high frequency mirror must run or oscillate at substantially its resonant frequency, since driving a high-Q mirror at a frequency only slightly different than the resonant frequency will result in a significant decrease in the amplitude of the beam sweep (i.e. reduce the beam envelope). This would cause a significant and unacceptable compression of the image on the display. Therefore, the high speed mirror drive is decoupled from the low speed mirror drive. That is, as mentioned above, the high speed drive signal cannot simply be selected to be an even multiple of the low speed drive signal.

Further, in a video display, each frame of incoming video signals representing video pixels (such as might be received from a TV station, a DVD player or a VCR player) must still be faithfully reproduced. This means, each pixel of each successive frame of video must be properly located on the screen of the display if distortions are to be avoided. Also of course, if complete image frames are lost or dropped, glitches or artifacts in the display would clearly be observed. Therefore, as described above in a torsional hinged mirror based video system, the low frequency mirror drive must still be synchronized to the flow rate of the incoming video signals. At the same time, however, the high speed mirror must still oscillate at substantially its resonant frequency. The problems discussed above are even further complicated if there has been some degradation of the video signal. For example, if the source of the video signals is a VCR, one common problem such as stretching of the VCR tape could vary the incoming frame rate, which must also be dealt with. Additionally, tracking or synchronizing the low speed mirror and the frame rate should be done in a way that minimizes transients from discontinuities in the drive waveform.

Therefore, a mirror based video system having increased brightness and that overcomes the above mentioned problems would be advantageous, but doubling the beam on time includes many difficult challenges.

SUMMARY OF THE INVENTION

These and other problems are generally solved or circumvented, and technical advantages are generally achieved by the embodiments of the present invention, which provide a method of generating at least two image frames for each cycle of the low speed mirror of a mirror display system, and synchronizing the low speed mirror with incoming image frame or video signals. More specifically, the method comprises the step of generating a cyclic drive signal (such as for example a sinusoidal or repetitive triangular drive signal) having positive and negative going display portions for positioning the low frequency mirror. The negative going and positive going display portions are sandwiched between a lower peak portion and an upper peak portion, and correspond to a portion of the mirror positions where a complete image frame of video signals are received and an image is generated in the display. A first initiate signal is generated at a selected point on the cyclic drive signal, and is provided to start a first time delay circuit. Then, after a first selected time delay, as determined by the first time delay circuit, a first arming signal is generated that determines the image frame location in the portion of the cycle going in a first direction. The location of an image frame in the portion of the cycle going in a second and opposite direction is then determined by a second time delay and second arming signal. Scan lines are then generated for a first image frame in response to the first arming signal, and scan lines are generated for a second image frame in response to the second arming signal. According to one embodiment, the first initiate or interrupt signal starts both the first and second time delay circuits. The second time delay is of course substantially longer than the first time delay. According to a second embodiment, the first initiate signal starts the first time delay, and a second initiate signal is generated at a selected point on the portion of the cyclic drive signal going in the second or opposite direction. Then, after a second selected time delay, a second arming signal is generated.

According to another embodiment, the selected point of the positive going portion and the selected point of the negative going portion of the cyclic drive signal is at the zero crossing point of the drive signal. According to yet another embodiment, the first initiate signal is generated by the receipt of a timing or interrupt signal in the group of signals comprising the first image frame, and the second initiate signal is generated by the receipt of a timing or interrupt signal included in the signals comprising the second image frame.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 3A through 3D are block diagrams of embodiments of circuitry suitable synchronizing the incoming data signals with the high speed and slow speed mirrors and for aligning first and second image frames.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 4:
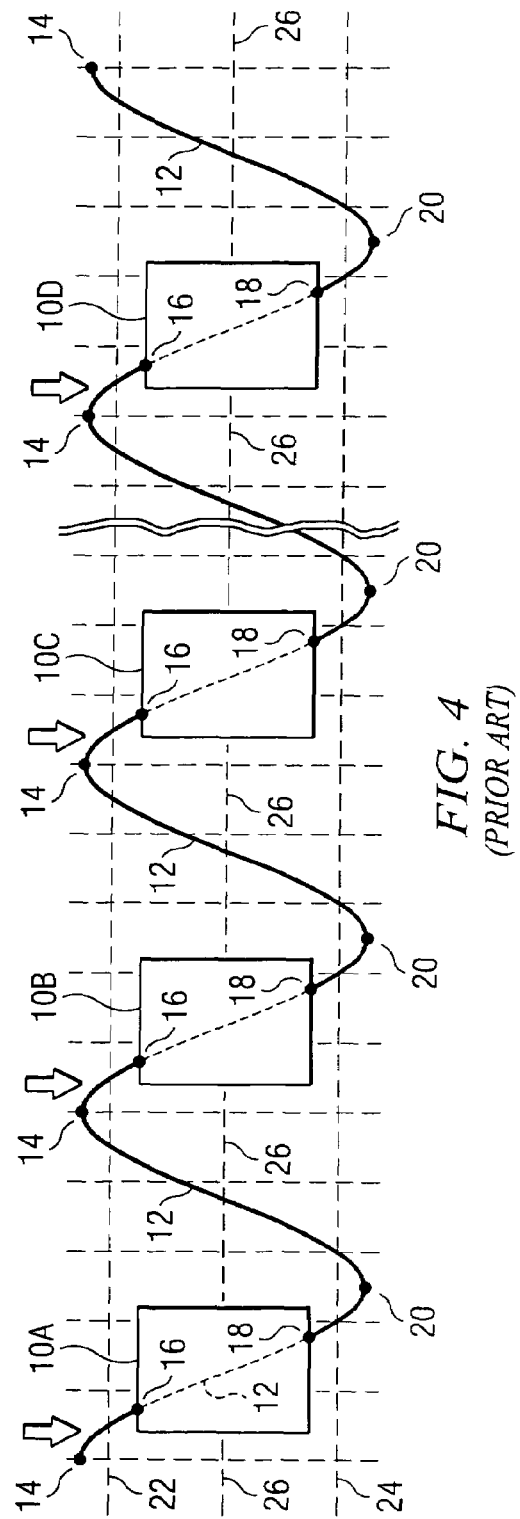
FIG. 4 is a prior art figure showing displays of video frame high frequency where the scan mirror operates at an even multiple of the low frequency positioning mirror.

Referring now to prior art FIG. 4, there is illustrated the interaction of a high speed horizontal scanning drive signal and a low speed (vertical) or scan line positioning signal used to control a prior art display formed by a raster scan, suitable for either a CRT display or a mirror based system. The terms "horizontal", used with respect to scanning drive signals, and "vertical", used with respect to the positioning signals, are for convenience and explanation purposes only, and it will be appreciated by those skilled in the art that the scan lines in a CRT display or a mirror based display could run vertical and the positioning signals could position the vertical scan lines horizontally across a display screen.

As shown in FIG. 4, four typical frames of video such as indicated by image boxes 10a, 10b, 10c, and 10d are generated during the same (substantially linear) portion of each cycle of the slow speed sinusoidal drive signal represented by curve 12. More specifically, if the slow speed positioning signal has a frequency of 60 Hz, then in the example of prior art FIG. 4, sixty different frames of video (i.e. complete images) and not just the four as illustrated would be generated in one second. Therefore, if as shown in the figure and discussed above, the frequency of the high speed or scanning drive signal is an even multiple of the frequency of the low speed signal, then each successive video frame can easily be started and located within one scan line of the same position on a display screen. For example, if transition point 14 represents both the end point of each cycle of the positioning slow speed drive signal and the start point of the next cycle of the drive signal, then point 16 can be set to always occur a certain timer period thereafter. Therefore, point 16 can be selected as the arming point (ready for the first scan line) of each frame since each scan line has the same number of pixels and each frame has the same number of scan lines. Likewise, point 18 will be the end point (or placement of the last scan line) of each frame. In the example of FIG. 4, the mirror or electron beam travels in a reverse direction between point 20 and point 14 of the cycle as the slow speed signal and the mirror are repositioned for the next frame of video signals. This movement in the reverse direction is sometimes referred to as "fly back". As discussed above, the portion of the drive signal between points 16 and 18 is substantially linear and is referred to hereinafter as the display portion of the slow speed drive signal, whereas the transition point 14 and the reverse point 20 not only are not located during a linear portion of the signal, but as mentioned represent where the positioning drive signal actually stops and reverses the direction of the mirror or electron beam. These reverse or "turn-around" portions (above line 22 and below line 24) of the drive signal are referred to hereinafter as the upper and lower peak portions or transition points of the drive signal. Unfortunately, although selecting a high speed scanning speed or drive signal that is an exact even multiple of the positioning or slow speed signal is a simple straight forward choice with electron beam displays, it is not nearly so simple with a mirror based system, and with known technology is substantially impossible if the high speed scanning mirror is to operate at its resonant frequency. Therefore, other solutions for synchronization are needed.

Figure 1A:
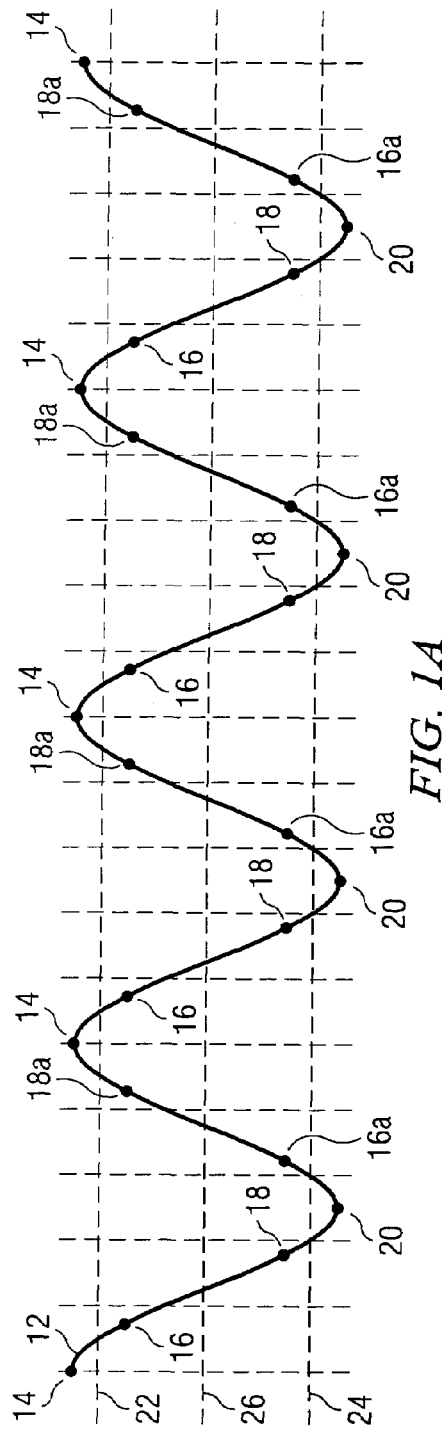
FIGS. 1A and 1B illustrate, respectively, low speed (scan line positioning) and high speed (resonant scanning) cyclic signals for driving the mirrors about their axis.
Figure 1B:
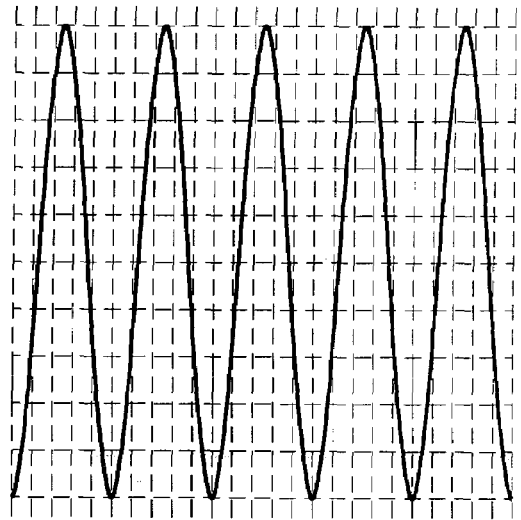

FIG. 1A is similar to FIG. 4 and represents the positioning or slow speed drive signal according to the present invention, without the frames of video. FIG. 1B represents the scanning drive signal and/or the corresponding scanning position of a resonant mirror according to the teachings of the present invention, but is not to scale with respect to FIG. 1A and, although theoretically possible, is not likely to have a frequency that is an even multiple frequency of the slow speed drive signal. As an example, the resonant frequency of a scanning torsional hinged mirror, such as illustrated in FIG. 1B, may be on the order of 20 kHz or greater.

Figure 1C:
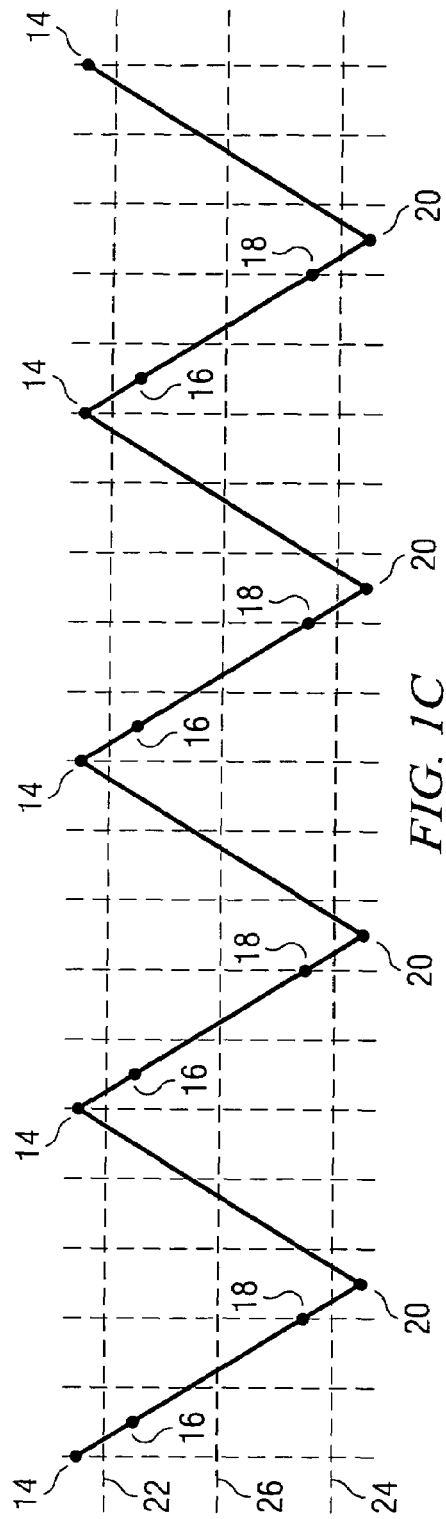
FIG. 1C is the same as FIG. 1A, except a triangular low speed drive signal is illustrated rather than a sinusoidal drive signal.

FIG. 1C is similar to FIG. 1A, except as shown, the slow speed cyclic drive signal has a repetitive triangular shape rather than a sinusoidal shape. The portion of the curve above and below lines 22 and 24 respectively still represent the upper and lower peak (or turn-around) portions of the mirror movement, and the portion of the curve between lines 22 and 24 still represent the display portion of the signal and/or mirror movement where the video frame is generated. It should also be appreciated that although the above detailed discussion has been with respect to a sinusoidal slow speed drive signal, such as shown in FIG. 1A, the discussion is equally applicable to other drive signals such as the repetitive triangular shaped drive signal such as illustrated in FIG. 1C. Furthermore, point 16 on curve 12 still represents the arming point (ready for the first scan line) of an image frame and point 18 still represents the stop point (last pixel) of the image frame. However, as discussed, the present invention generates an image frame in the positive going portions of the sinusoidal motion of the mirror and also generates another image frame in the negative going portions of the sinusoidal motion to double the brightness of the display. Therefore, unlike prior art FIG. 4, point 16a represents the start point of a second image frame produced during a single sinusoidal cycle, and point 18a represents the end point of the second image frame. It will also be appreciated that the image lines comprising a second image frame will be displayed in the reverse order from the first image frame.

However, as discussed above, the difficulty is getting image frames generated in the positive going portion of the slow speed mirror to align with the image frames generated in the negative going portion of the slow speed mirror. Further, line 26 in both FIGS. 1A and 1C represent the "0" voltage point or zero crossover point of the cyclic signals.

As discussed above, it will be appreciated that if the scanning speed of a torsional hinge resonant mirror as represented by the graph of FIG. 1B could simply be selected to be an even multiple of the speed of the slow speed positioning mirror, synchronization of the two images on a mirror display would be a straight forward timing issue. Unfortunately, although resonant mirrors can be manufactured within reasonable tolerances, the actual resonant frequencies cannot be controlled so that the resonant speed of the mirrors formed on a silicon wafer could be precisely manufactured as an even multiple of a speed selected for the slow speed mirror. Further, as was disclosed above, driving a high speed resonant mirror at a frequency only slightly off of its resonant speed can drastically reduce the sweep amplitude of the mirror.

Figure 2A:
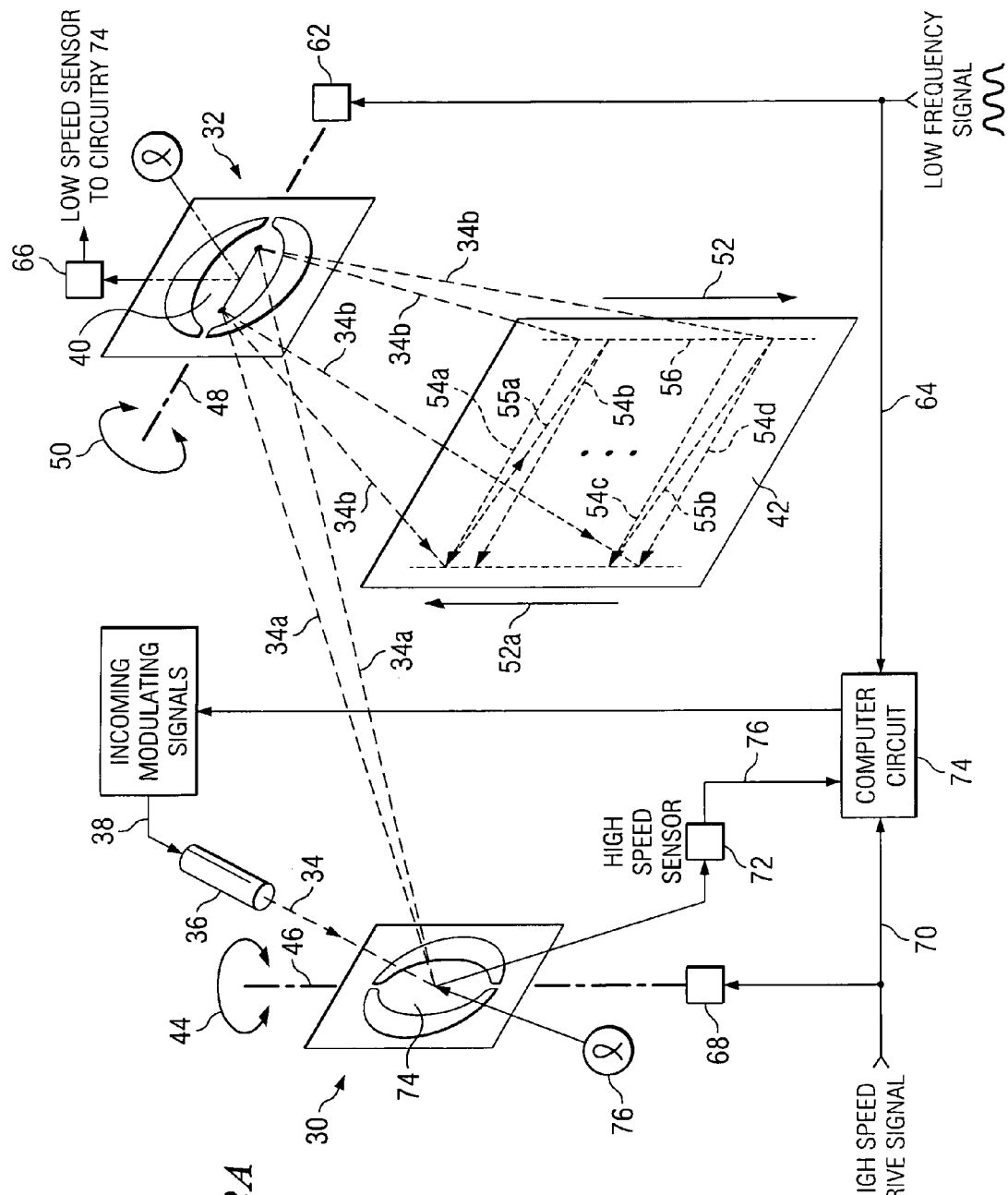
FIGS. 2A and 2B are simplified diagrams illustrating a torsional hinged mirror based display system using two single axis mirrors.

Referring now to FIG. 2A, there is a perspective illustration of an embodiment of the present invention that uses two single axis separate mirrors that pivot about their torsional hinges. As shown, a high frequency or scanning single axis torsional hinged mirror 30 may be used in combination with a low frequency or positioning single axis torsional hinged mirror 32 to provide a raster scan. A light beam 34 from a source 36 is modulated by incoming signals on line 38 to generate pixels that comprise the scan lines. The modulated light beam 34 impinges on the high frequency resonant mirror 30 and is reflected as sweeping light beam 34 to the reflecting surface 40 of the low frequency positioning mirror 32. Positioning mirror 32 redirects the modulated light beam 34b to a display surface 42, which may be a screen or light sensitive printer medium. The oscillations of the high frequency scanning mirror 30 (as indicated by arcuate arrow 44) around pivot axis 46 results in light beam 34b (the scan lines) sweeping across the display surface 42, whereas the oscillation of the positioning mirror 32 about axis 48 (as indicated by double headed arrow 50) results in the scan lines being positioned vertically (or orthogonally to the scan lines) on the display surface 42. It is again noted that the terms horizontal and vertical are for explanation purposes only. Therefore, since the scanning motion of light beam 34b across display surface 42 may occur several hundred or even a thousand times during the orthogonal movement in one direction of the low speed positioning mirror 32, as indicated by arrow 52, a raster scan type image can be generated or printed on display surface 42 as indicated by image lines 54, 54b, 54c, and 54d. The "fly-back" or travel in the opposite direction of the high speed scanning mirror is indicated by dashed lines 55a and 55b.

Then, according to the present invention, the slow speed mirror changes direction and starts its return motion as indicated by arrow 52a and returns again to starting point 56. However, the individual image lines are clocked out in a reverse order (not shown) so that the last line displayed in the first direction is equivalent to the first line displayed in the second direction.

Figure 2B:
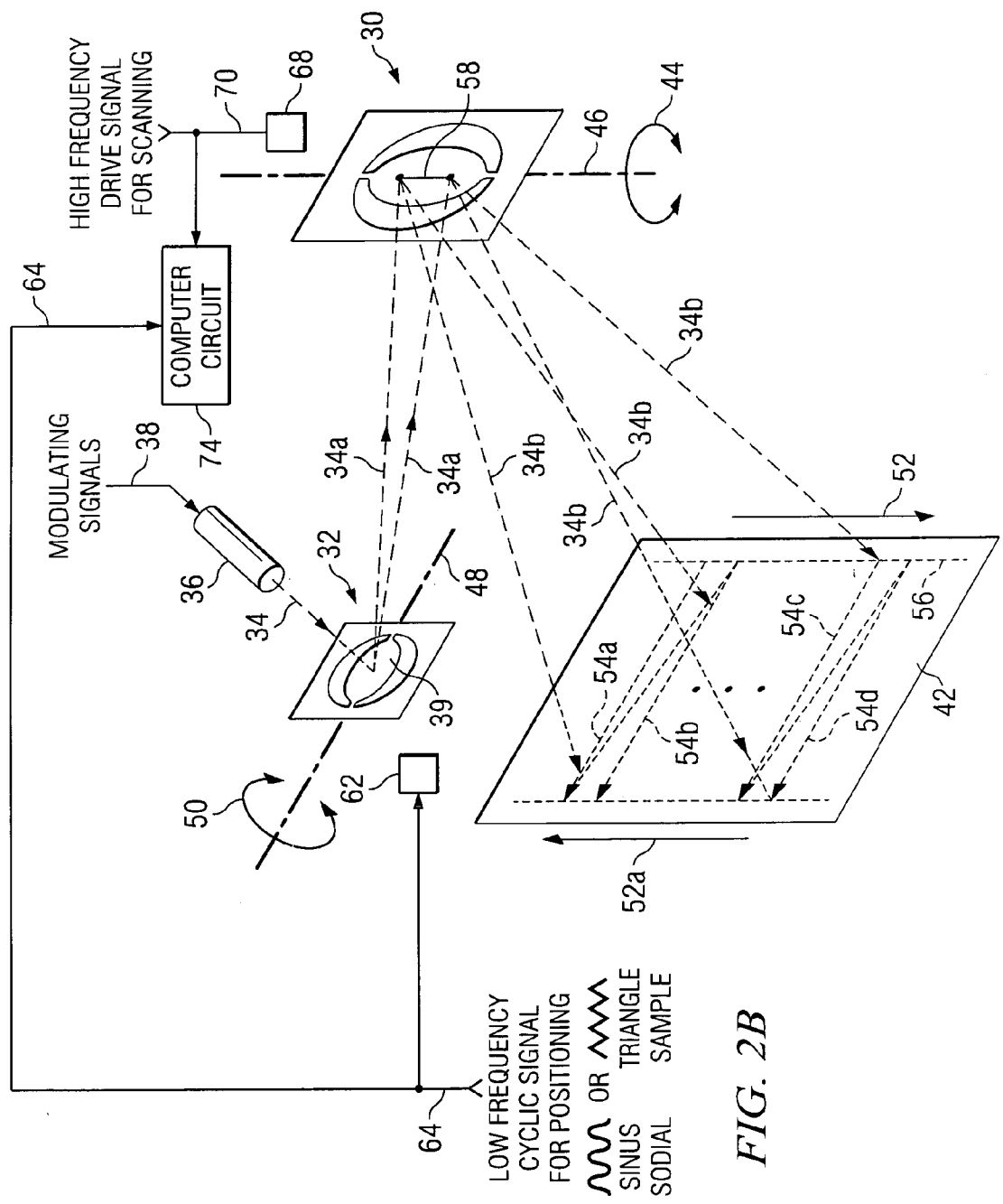

Referring to FIG. 2B, there is a perspective illustration of another embodiment of the present invention using two single axis separate mirrors that pivot about their torsional hinges. In this arrangement and contrary to the embodiment of FIG. 2A, the modulated beam is reflected from the positioning mirror 32 to the scanning mirror 30. As shown, light beam 34 from source 36 is modulated by incoming video signals on line 38 as was discussed above, and impinges on the low frequency positioning mirror 32 rather than the high speed scanning mirror 30. The modulated light beam 34a is then reflected off of reflecting surface 39 of the mirror 32 to the reflecting surface 40 of the high frequency oscillation or scanning mirror 30. Mirror 30 redirects the modulated light beam 34b to display surface 42. The oscillations (as indicated by arcuate arrow 44) of the scanning mirror 30 about axis 46 still results in light beam 34b or the scan lines sweeping horizontally across display surface 42, whereas the oscillation of the positioning mirror 32 still results in the scan lines being positioned vertically on the display surface.

That is, oscillations of the positioning mirror 32 about axis 48 as indicated by double headed arcuate arrow 50 still moves the reflected modulated light beam 34a with respect to scanning mirror 30 such that the light beam 34a moves orthogonally to the scanning motion of the light beam as indicated by line 58 in the middle of the reflecting surface of scanning mirror 30. Thus, it will be appreciated that in the same manner as discussed above with respect to FIG. 2A, the high frequency scanning motion of the light beam 34b as indicated by image lines 54a, 54b, 54c, and 54d on display screen 42 will still occur several hundred or even a thousand times during a single orthogonal movement of the low frequency positioning mirror 32. Therefore, as was the case with the embodiment of FIG. 2A, a raster scan type visual display can be generated or painted on display surface 42 in both directions as indicated by arrow 52 and 52a.

Figure 2C:
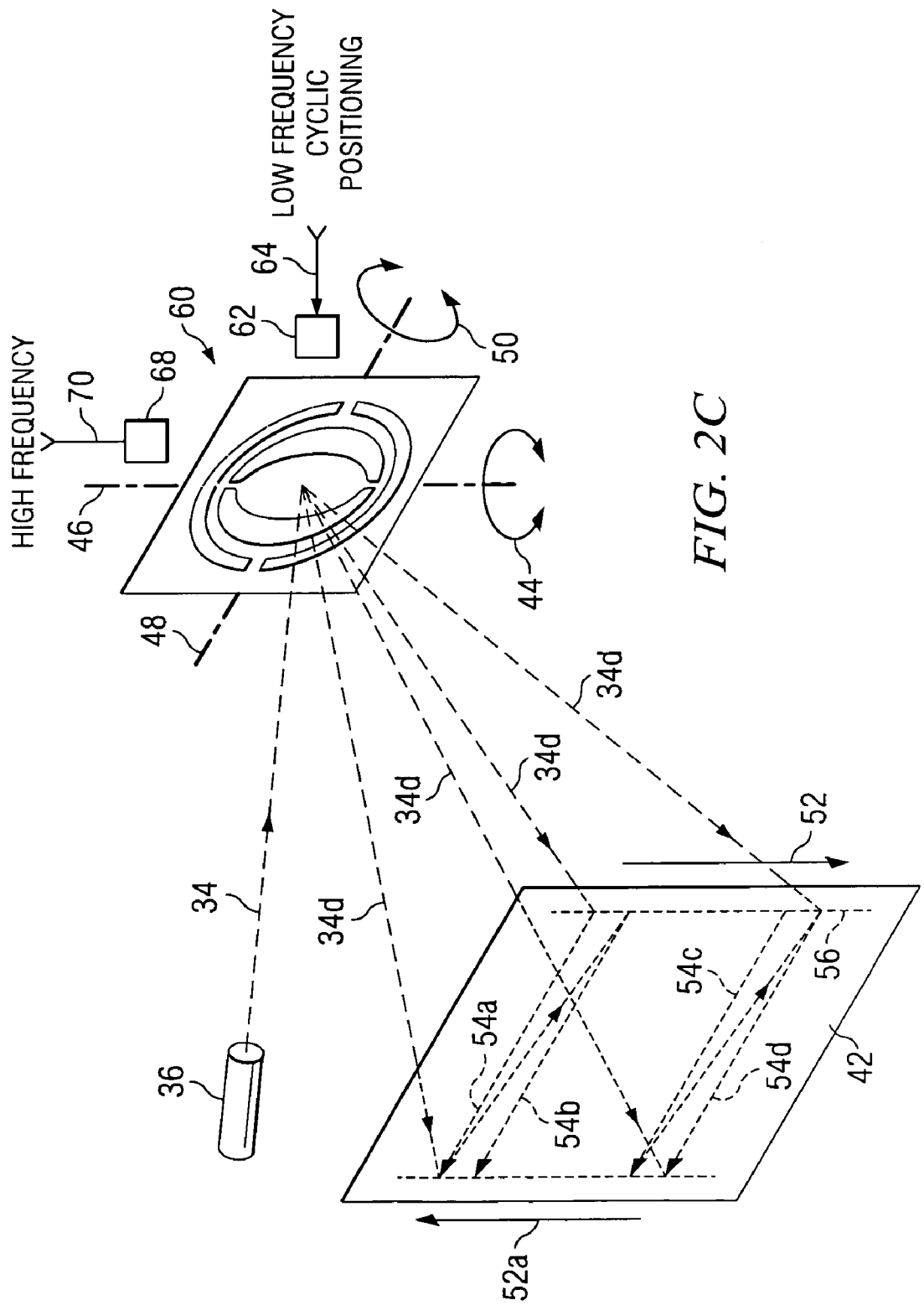
FIG. 2C is a simplified diagram illustrating another embodiment comprising a single dual axis mirror in place of the two single axis mirrors.

The above discussion with respect to FIGS. 2A and 2B is based on two single axis torsional hinged mirrors. However, as will be appreciated by those skilled in the art, a single dual axis torsional hinged mirror, such as mirror structure 60 shown in FIG. 2C, may be used to provide both the high frequency scanning motion about axis 46 as indicated by arcuate arrow 44, and the positioning or orthogonal motion about axis 48 as indicated by arcuate arrow 50, in the same manner as the oscillation of the individual mirrors 30 and 32 discussed in the embodiment of FIGS. 1A and 1B. The remaining elements of FIG. 2C operate the same as in FIGS. 2A and 2B and consequently carry the same reference number. It should also be noted, however, that the modulated light beam is only reflected one time and, therefore, the reflected beam carries reference number 34d.

According to the present invention, synchronization of the incoming signals to the movement of the mirror as well as alignment of the two images generated by each cycle of the slow speed mirror may be accomplished without external feedback. Therefore, referring again to FIGS. 2A through 2C as shown, there is a drive mechanism 62 for positioning the low speed mirror 32 in response to a cyclic low frequency signal such as illustrated in FIGS. 1A and 1B and which is received on input line 64. It is this low frequency cyclic drive signal that may be used to synchronize the incoming signals with the motion and position of mirror 32. It will be appreciated, of course, that a sensor 66, as shown in FIG. 2A, or other form of external feedback could be used to synchronize the incoming signals with the motion and position of the mirror. In addition, the low frequency drive signal alone may also be used to align the two images to be accurate within one scan line.

There is also included a high speed drive mechanism 68 responsive to high frequency signals on input line 70 for driving the high speed mirror at its resonant frequency. However, the high frequency drive signal alone cannot be used to determine or infer the position of the high speed mirror 30, and therefore, requires external feedback, such as sensor 72. More specifically, at the resonant frequency of the high speed mirror, the transfer function used for the calculation goes through a 180° phase change. Consequently, the frequency of the mirror can be determined from the drive signal, but the phase of the mirror cannot be determined in this manner. As shown in FIG. 2A, there is also included, computer circuitry 74 that also receives the drive signals on lines 64 and 70 as well as an external signal on line 76 indicative of the position of the high speed mirror 30. Therefore, the position of the mirrors can be calculated and the appropriate synchronization and alignment signals can be generated. More specifically, computer circuitry 74 along with appropriate software, the drive signals and the high speed mirror positioning signal can determine the timing of the trigger signals to start painting an image.

Referring now to FIG. 2A along with FIGS. 3A through 3D, there are shown hardware embodiments for aligning or placing the two images generated during a single cycle of the slow speed mirror. As shown in FIGS. 3A–3D, the low frequency cyclic signal on line 64 for positioning the low speed mirror is provided to detection circuitry 86. The following procedural steps are preferably carried out by computer circuitry 74 in combination with software, but the hardware examples of FIG. 3A through FIG. 3D help explain the process, and show several different approaches. Detection circuitry 86 may for example include a comparator circuit. Computer circuitry 74 (or detection circuitry 86) may also determine when the cyclic drive signal (such as a sinusoidal or a repetitive triangular saw tooth signal) is at a selected point or location of the drive signal waveform. One such selected point may advantageously be chosen to be where the drive signal makes a "zero crossing" and changes from a negative voltage to a positive voltage or from a positive voltage to a negative voltage. According to the embodiment of the invention, shown in FIG. 3A, there is a selected location or point in both the portion of the signal going in a first direction and the portion of the signal going in a second or opposite direction such that a first initiate or timing signal and a second initiate signal is generated. The initiate signals are provided respectively on conductors 88 and 90 to first and second delay circuits 92 and 94. The two delay circuits 92 and 94 generate first and second arming signals on lines 96 and 98 that are used by the computer circuitry 74 to arm the clocking out of the signals representing the individual pixels of an image frame. The signals representing the individual pixels modulate the light beam received from light source 36. In the embodiment of FIG. 3A, the initiate signal on line 88 to delay circuit 92 is the square pulse representing the zero crossing in a first direction. The first delay circuit 92 reacts on the leading edge of the signal. The initiate signal is also provided on line 90 to delay circuit 94 and reacts to the trailing edge representing the zero crossing in the opposite direction. Further, the arming signal from the first delay circuit 92 locates the first scan line to be displayed in a first image of a cycle, and the arming signal from the second delay circuit 94 locates the first scan line to be displayed in the second frame of the cycle. Also, as shown by dotted line 90, detection circuit 86 (or computer circuitry 74) could send out a separate initiate signal to the second delay circuit.

As discussed above and according to a first embodiment, the "zero crossing" in both the positive and negative direction can advantageously be used as the selected point. Choosing the "zero crossing" as the selected point is advantageous because of the excellent signal to noise characteristics. It should also be appreciated, however, that due to phase delay (inherent to mechanical systems) the two time delays, provided by the two circuits 92 and 94 may be different.

However, if the set point is adjusted to fall midway between the two arming points rather than on the "zero crossing" point, a single delay circuit may be used.

For example as shown in the embodiment of FIG. 3B, the set point is selected so that it is equal distance or midway between the two arming signals. Further, the set point is, of course, still detected as the drive signal moves in both the directions. The output from the detection circuit 86 or computer circuitry 74 is then provided to a single delay circuit 100, which provides an output to flip flop 102, which in turn provides the first arming signal on line 96 to start generating of the first image and the second arming signal on line 98 to start generating of the second image.

Alternately, and referring now to FIGS. 3C and 3D, a single initiate or interrupt signal may be used to generate both arming signals. As shown in FIG. 3C, a single initiate signal is provided on line 104 to the first time delay circuit, which generates the first arming signal on line 96 and also starts the second time delay circuit 94. The second arming signal is generated after the second delay circuit 94 times out. However, according to FIG. 3D, the single interrupt signal starts both time delay circuits and each generates an arming signal where the delay times out. Of course, since the second arming signal is about 180 degrees later than the first arming signal the time delay of the second delay circuit 94 is substantially longer than the first time delay circuit 92.

The data or signals that comprise a full image often include a timing signal (or interrupt signal) that can be used to precisely determine the start or end of the next image frame. This allows the incoming data signals to be synchronized so that the image frame may be properly positioned to start at the same point of the display portion during the slow speed mirror movement for each image frame.

Therefore, according to still another embodiment, it will be appreciated that the series of data signals that generate the pixel for each full image also includes a timing or interrupt signal, and therefore, by synchronizing the slow frequency drive signal to one or both of the interrupt signals as discussed above, the interrupt signal can be used to generate the arming signals instead of using the drive signals. This approach may be more stable and result in less jitter.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the system, means, methods and steps described in the specification. As one of ordinary skill in the art will readily appreciate from the disclosure of the present invention, system, manufacture, means, methods, or steps, presently existing or later to be developed, that perform substantially the same function or achieve substantially the same result as the corresponding embodiments described herein may be utilized according to the present invention. Accordingly, the appended claims are intended to include within their scope such system, means, methods, or steps.

What is claimed is:

1. In a display system comprising an oscillating high frequency mirror for generating scan lines for an image frame and an oscillating low frequency mirror for positioning said scan lines of said image frame, a method of generating at least two frames of images for each cycle of said oscillating low frequency mirror, comprising the steps of:
   providing a cyclic drive signal having positive and negative going portions to said low speed mirror for positioning said scan lines;
   generating a first initiate signal during said cyclic drive signal;
   generating a first arming signal after a first selected time delay and in response to said first initiate signal;
   generating a second arming signal after a second selected time delay;
   generating said scan lines as said low frequency mirror travels in a first direction, and in response to said first arming signal; and
   generating said scan lines as said low frequency mirror travels in a second direction opposite said first direction and in response to said second arming signal.

2. The method of claim 1 further comprising the step of generating a second initiate or interrupt signal and wherein said step of generating said second arming signal is in response to said second initiate or interrupt signal.

3. The method of claim 2 wherein said step of generating first and second initiate signals comprises selecting first and second points on said cyclic drive signal and generating said first and second initiate signals when said cyclic drive signal corresponds to said first and second selected points.

4. The method of claim 3 wherein said first selected point is at a zero voltage crossing point during said positive going portion of said cyclic drive signal and said selected point is at the zero voltage crossing point during said negative going point of said cyclic drive signal.

5. The method of claim 3 wherein said first and second points are selected so that said first and second time delays are equal.

6. The method of claim 2 wherein said first initiate signal is generated by the receipt of signals comprising said first image frame and said second initiate signal is generated by the receipt of the signals comprising the next or second image frame.

7. The method of claim 4 wherein said cyclic signal is monitored with a circuit that changes its output state each time said cyclic slow speed signal crosses the zero voltage point and generates said first and second initiate signals in response to said output changing state.

8. The method of claim 1 wherein both said first and second time delays are started in response to said first interrupt or initiate signal.

9. The method of claim 1 wherein said first arming signal also starts or initiates said second time delay.

* * * * *